United States Patent
Takeuchi et al.

(10) Patent No.: US 6,517,460 B2
(45) Date of Patent: Feb. 11, 2003

(54) ECCENTRIC ORBITING TYPE SPEED REDUCER AND JOINT FOR INDUSTRIAL MACHINE EQUIPPED WITH THE SAME

(75) Inventors: Kenichi Takeuchi, Mie (JP); Jun Hirose, Mie (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/847,967

(22) Filed: May 3, 2001

(65) Prior Publication Data

US 2001/0044356 A1 Nov. 22, 2001

(30) Foreign Application Priority Data

May 15, 2000 (JP) ........................................ 2000-141119

(51) Int. Cl.$^7$ ................................................. F16H 1/32
(52) U.S. Cl. ........................ 475/162; 475/178; 475/179
(58) Field of Search ................................ 475/162, 178, 475/179

(56) References Cited

U.S. PATENT DOCUMENTS

| | | | | |
|---|---|---|---|---|
| 3,129,611 A | * | 4/1964 | Lee | 475/179 |
| 4,407,170 A | * | 10/1983 | Fukuo | 475/179 |
| 4,656,891 A | * | 4/1987 | Durand | 475/179 |
| 4,846,018 A | * | 7/1989 | Matsumoto et al. | 475/179 |
| 5,178,046 A | * | 1/1993 | Matsumoto et al. | 475/178 |
| 5,322,485 A | * | 6/1994 | Haga | 475/178 |
| 5,655,985 A | * | 8/1997 | Herstek | 475/179 |
| 5,908,372 A | * | 6/1999 | Janek | 475/168 |

FOREIGN PATENT DOCUMENTS

| | | |
|---|---|---|
| JP | 7-108485 A | 4/1995 |
| JP | 9-57678 A | 3/1997 |

* cited by examiner

*Primary Examiner*—Sherry Estremsky
(74) *Attorney, Agent, or Firm*—Akin Gump Strauss Hauer & Feld, L.L.P.

(57) ABSTRACT

An eccentric orbiting type speed reducer for the joint of the industrial machine has a plurality of crankshafts, a rotational driving force being input into one crankshaft alone among the plurality of crankshafts, in which the bearing capacity for one crankshaft among the plurality of crankshafts is greater than the bearing capacities for other crankshafts.

4 Claims, 13 Drawing Sheets

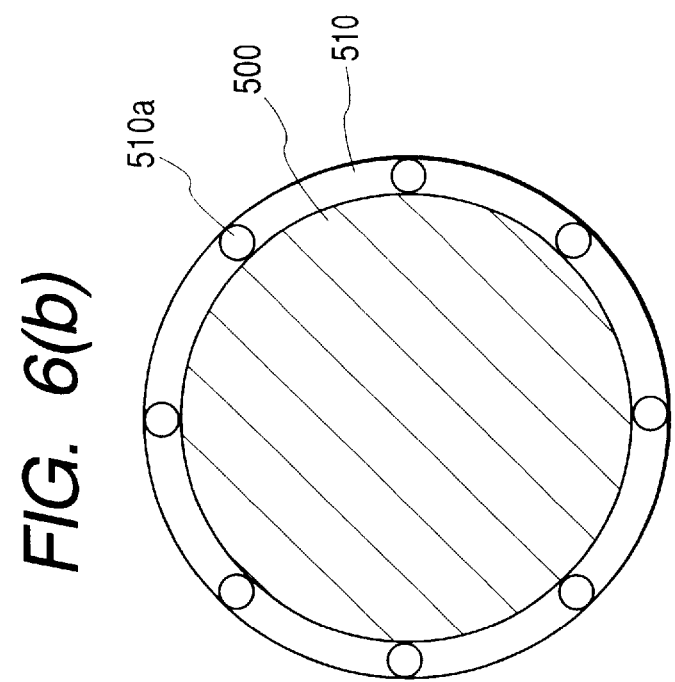
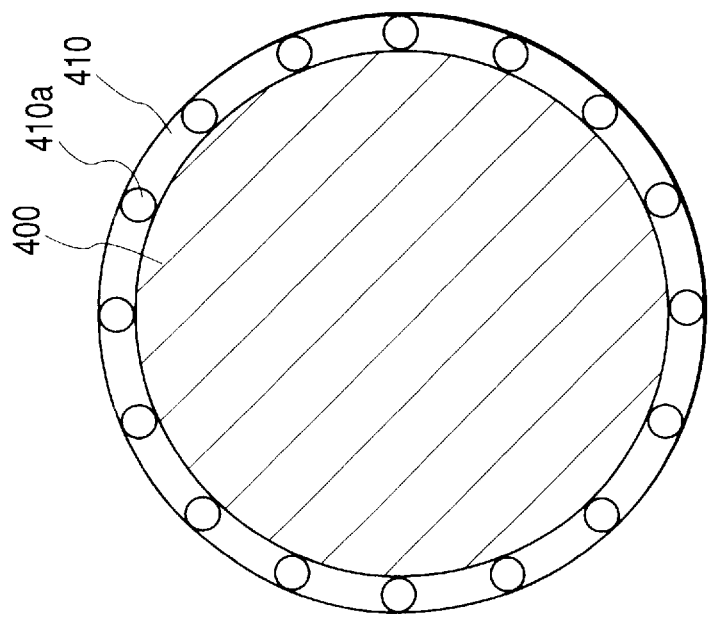

ECCENTRIC ORBITING TYPE SPEED REDUCER AND JOINT FOR INDUSTRIAL MACHINE EQUIPPED WITH THE SAME

BACKGROUND OF THE INVENTION

The present invention relates to an eccentric orbiting type speed reducer for use with the industrial machine such as an industrial robot or machine tool, and a joint of the industrial machine equipped with the eccentric orbiting type speed reducer, and more particularly to an eccentric orbiting type speed reducer having a plurality of crankshafts in which a rotational force is applied to one of the plurality of crankshafts, and a joint of the industrial machine equipped with the eccentric orbiting type speed reducer.

Conventionally, the joint of the industrial machine equipped with the speed reducer is well-known in which a rotational driving force output from a servo motor is input into a plurality of crankshafts of the speed reducer via a gear supported with the rotational axis on the same straight line as the rotational axis of the speed reducer, as described in JP-A-7-108485, for example.

Referring now to FIGS. 10 and 11, a joint 800 of the industrial machine as described in JP-A-7-108485 will be described below.

If a rotational driving force is output from a servo motor 801, the rotational driving force output from the servo motor 801 is input via a gear 802 into the gears 806 and 807 supported by the bearings 804 and 805 so that the rotational axis may be on the same straight line as the rotational axis of a speed reducer 803. The rotational driving force input into the gears 806 and 807 is input via a plurality of gears 808, 809, 810 and 811 disposed to be mated with a gear 807 into a plurality of crankshafts 803*a*, 803*b*, 803*c* and 803*d* of the speed reducer 803.

In FIG. 10, though the details of the speed reducer 803 are not shown, the speed reducer 803 rotates a body of rotation 820 with respect to an anchor block 830 secured in the floor in accordance with a rotational driving force input into the plurality of crankshafts 803*a*, 803*b*, 803*c* and 803*d*, if the rotational driving force is input into the plurality of crankshafts 803*a*, 803*b*, 803*c* and 803*d*.

As described above, the joint 800 of the industrial machine rotates the body of rotation 820 with respect to the anchor block 830 secured in the floor, if the rotational driving force output from the servo motor 801 is input into the plurality of crankshafts 803*a*, 803*b*, 803*c* and 803*d* of the speed reducer 803.

Also, another joint of the industrial machine equipped with the speed reducer is well-known in which a rotational driving force output from the servo motor is input into a specific crankshaft of the speed reducer, and the remaining crankshafts of the speed reducer via a gear disposed at the top end of the crankshaft having the rotational driving force input and a gear supported so that the rotational axis may be on the same straight line as the rotational axis of the speed reducer, as described in JP-A-9-57678, for example.

Referring now to FIGS. 12 and 13, a joint 900 of the industrial machine as described in JP-A-9-57678 will be described below.

If a rotational driving force is output from a servo motor 901, the rotational driving force output from the servo motor 901 is input via the gears 902 and 903 into a specific crankshaft 905 of a speed reducer 904, and input into the remaining crankshafts 910 of the speed reducer 904 via a gear 903 disposed at the top end of the crankshaft 905, a gear 908 supported by the bearings 906 and 907 so that the rotational axis maybe on the same straight line as the rotational axis of the speed reducer 904, and a gear 909.

The speed reducer 904 rotates the body of rotation 920 with respect to an anchor block 930 secured in the floor in accordance with a rotational driving force input into the crankshafts 905 and 910, if the rotational driving force is input into the crankshafts 905 and 910.

As above described, the joint 900 of the industrial machine rotates the body of rotation 920 with respect to the anchor block 930 secured in the floor, if a rotational driving force output from the servo motor 901 is input into the plurality of crankshafts 905 and 910 of the speed reducer 904.

Accordingly, in the joint of the conventional industrial machine, since the rotational driving force output from the servo motor is input in equal quantity into the plurality of crankshafts of the speed reducer, it is possible to prevent the life of the speed reducer, particularly, the life of the crankshafts from being shorter.

However, in the joint of the conventional industrial machine as described above, since a rotational driving force output from the servo motor was input in equal quantity into the plurality of crankshafts for the speed reducer, it was required to have a gear supported with the rotational axis on the same straight line as the rotational axis of the speed reducer, and a bearing for supporting the gear. Therefore, there was the problem that the manufacturing costs were increased due to the increased number of parts. That is, in the joint 800 of the industrial machine as shown in FIGS. 10 and 11, it is required to have the gears 806 and 807 supported so that the rotational axis may be on the same straight line as the rotational axis of the speed reducer 803, and the bearings 804 and 805 for supporting the gears 806 and 807. In the joint 900 of the industrial machine as shown in FIGS. 12 and 13, it is required to have the gear 908 supported so that the rotational axis may be on the same straight line as the rotational axis of the speed reducer 904, and the bearings 906 and 907 for supporting the gear 908.

SUMMARY OF THE INVENTION

It is an object of this invention to provide an eccentric orbiting type speed reducer that can be manufactured at low costs by preventing an increase in the number of parts, and a joint of the industrial machine equipped with the eccentric orbiting type speed reducer.

According to the present invention, there is provided an eccentric orbiting type speed reducer comprising an internal tooth member having the internal teeth formed on the inner circumference, a first rotational member with a plurality of circular grooves formed inside that is carried rotatably by the internal tooth member, while keeping a coaxial relation with the internal tooth member, a second rotational member with a plurality of circular grooves formed inside, the plurality of circular grooves being opposed respectively to the plurality of circular grooves for the first rotational member, the second rotational member being carried rotatably by the internal tooth member, while keeping a coaxial relation with the internal tooth member, an external gear having the external teeth formed on the outer circumference, with a plurality of through holes formed inside, the external teeth meshing with the internal teeth of the internal tooth member, the external gear being carried between the first rotational member and the second rotational member, a plurality of crankshafts having the first insertion portions to be inserted respectively into the plurality of pairs of opposed circular grooves for the first rotational member and the second rotational member, and the second insertion portions to be inserted respectively into the plurality of through holes for the external gear and orbiting eccentrically the external gear, a plurality of pairs of first bearings for holding the first insertion portions of the crankshafts rotatably with respect to the first rotational member and the second rotational member, respectively, and a plurality of second bearings for holding the second insertion portions of the crankshafts rotatably with respect to the external gear, characterized in that the basic radial load rating of the first bearing into which the first insertion portion of one of the plurality of crankshafts is inserted is greater than the basic radial load ratings of the first bearings into which the first insertion portions of the remaining crankshafts among the plurality of crankshafts are inserted. With this constitution, the eccentric orbiting type speed reducer of this invention can prevent the life of the first bearing for rotatably holding the crankshaft having the rotational driving force input from being shorter. Therefore, the rotational driving force may be input into one crankshaft alone among the plurality of crankshafts. Consequently, the eccentric orbiting type speed reducer can be manufactured at lower costs by preventing an increase in the number of parts. In the eccentric orbiting type speed reducer of the invention, the hardness of a rolling element of the first bearing for holding rotatably the crankshaft having the rotational driving force input is more than those of other first bearings. In this way, it is possible to prevent the life of the first bearing for holding rotatably the crankshaft having the rotational driving force input from being shorter, while the first bearing for holding rotatably the crankshaft having the rotational driving force input is identical in dimension to the other first bearings.

Also, according to the invention, there is provided an eccentric orbiting type speed reducer comprising an internal tooth member having the internal teeth formed on the inner circumference, a first rotational member with a plurality of circular grooves formed inside that is carried rotatably by the internal tooth member, while keeping a coaxial relation with the internal tooth member, a second rotational member with a plurality of circular grooves formed inside, the plurality of circular grooves being opposed respectively to the plurality of circular grooves for the first rotational member, the second rotational member being carried rotatably by the internal tooth member, while keeping a coaxial relation with the internal tooth member, an external gear having the external teeth formed on the outer circumference, with a plurality of through holes formed inside, the external teeth meshing with the internal teeth of the internal tooth member, the external gear being carried between the first rotational member and the second rotational member, a plurality of crankshafts having the first insertion portions to be inserted respectively into the plurality of pair of opposed circular grooves for the first rotational member and the second rotational member, and the second insertion portions to be inserted respectively into the plurality of through holes for the external gear and orbiting eccentrically the external gear, a plurality of pairs of first bearings for holding the first insertion portions of the crankshafts rotatably with respect to the first rotational member and the second rotational member, and a plurality of second bearings for holding the second insertion portions of the crankshafts rotatably with respect to the external gear, characterized in that the basic radial load rating of the second bearing into which the second insertion portion of one of the plurality of crankshafts is inserted is greater than the basic radial load ratings of the rolling elements of the second bearings into which the second insertion portions of the remaining crankshafts among the plurality of crankshafts are inserted. With this constitution, the eccentric orbiting type speed reducer of this invention allows the rotational driving force to be input into one crankshaft alone among the plurality of crankshafts. Consequently, the eccentric orbiting type speed reducer can be manufactured at lower costs by preventing an increase in the number of parts. Also, the eccentric orbiting type speed reducer of this invention can prevent the life of the second bearing for rotatably holding the crankshafts having the rotational driving force input from being shorter. In the eccentric orbiting type speed reducer of the invention, the hardness of a rolling element of the second bearing for holding rotatably the crankshaft having the rotational driving force input is more than those of other second bearings. In this way, it is possible to prevent the life of the second bearing for holding rotatably the crankshaft having the rotational driving force input from being shorter, while the second bearing for holding rotatably the crankshaft having the rotational driving force input is identical in dimension to the other second bearings.

According to the invention, there is provided a joint for an industrial machine comprising an eccentric orbiting type speed reducer for eccentrically orbiting an external tooth member with respect to an internal tooth member, and a motor having an output shaft for outputting a rotational driving force, wherein the eccentric orbiting type speed reducer comprises the internal tooth member having the internal teeth formed on the inner circumference, a first rotational member with a plurality of circular grooves formed inside that is carried rotatably by the internal tooth member, while keeping a coaxial relation with the internal tooth member, the second rotational member with a plurality of circular grooves formed inside, the plurality of circular grooves being opposed to the plurality of circular grooves for the first rotational member, the second rotational member being carried rotatably by the internal tooth member, while keeping a coaxial relation with the internal tooth member, an external gear having the external teeth formed on the outer circumference, with a plurality of through holes formed inside, the external teeth meshing with the internal teeth of the internal tooth member, the external gear being carried between the first rotational member and the second rotational member, a plurality of crankshafts having the first insertion portions to be inserted respectively into the plurality of pair of opposed circular grooves for the first rotational member and the second rotational member, and the second insertion portions to be inserted respectively into the plurality of through holes for the external gear, a plurality of pairs of first bearings for holding the first insertion portions of the crankshafts rotatably with respect to the first rotational member and the second rotational member, the first bearings being inserted into the plurality of pairs of opposed circular grooves for the first rotational member and the second rotational member, and a plurality of second bearings for holding the second insertion portions of the crankshafts rotatably with respect to the external gear, the second bearings being inserted into the plurality of through holes for the external gear, characterized in that the rotational driving force output from the output shaft is input into the crankshaft in which the basic radial load rating of the first bearing and/or second bearing is greater than those of the other crankshafts. With this constitution, the joint of the industrial machine of this invention allows the rotational driving force to be input into one crankshaft alone among the plurality of crankshafts. Consequently, the joint of the industrial machine can be manufactured at lower costs by preventing an increase in the number of parts. Also, the joint of the industrial machine of this invention can prevent the shorter life because of the use of the speed reducer with no shorter life.

The present disclosure relates to the subject matter contained in Japanese patent application No. 2000-141119 (filed on May 15, 2000), which is expressly incorporated herein by reference in its entirety.

BRIEF DESCRIPTION OF THE DRAWINGS

FIG. 6 is a schematic view for explaining another embodiment of the invention.

DESCRIPTION OF THE PREFERRED EMBODIMENT

One preferred embodiment of the present invention will be described below with reference to FIGS. 1 to 9.

Referring to FIGS. 1 to 5, the constitution of a joint 300 of the industrial machine according to this embodiment of the invention will be first described.

Figure 1:
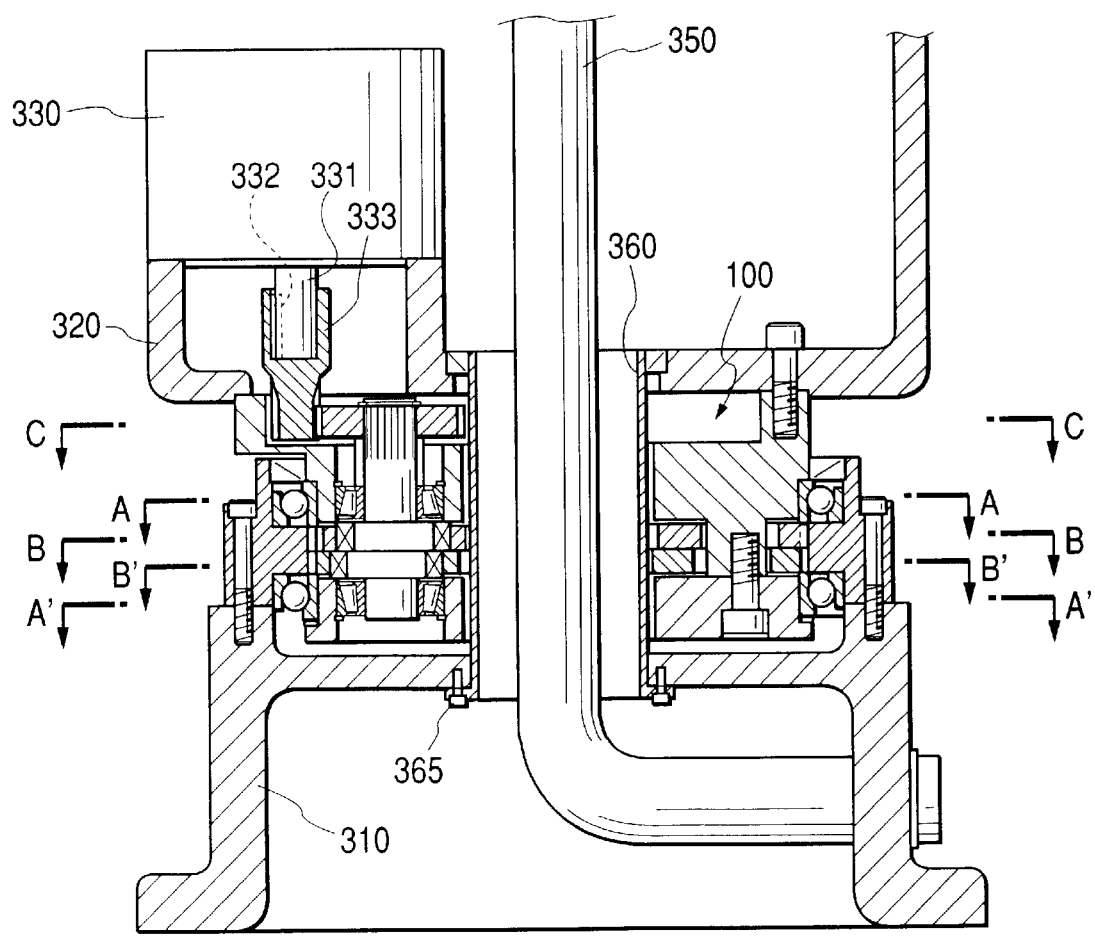
FIG. 1 is a front cross-sectional view of a joint of the industrial machine according to one embodiment of the invention.

In FIG. 1, the joint 300 of the industrial machine is equipped with an eccentric orbiting type speed reducer 100.

In FIGS. 2 to 5, the eccentric orbiting type speed reducer 100 is provided with an internal tooth member 110 having the internal teeth 110a formed on the inner circumference.

The eccentric orbiting type speed reducer 100 comprises a first rotational member 120 having three circular grooves 120a, 120b and 120c formed inside, and being held rotatably by the internal tooth member 110 via an angular ball bearing 125, while keeping a coaxial relation with the internal tooth member 110, and a second rotational member 130 having three circular grooves 130a, 130b and 130c formed inside, and being held rotatably by the internal tooth member 110 via an angular ball bearing 135, while keeping a coaxial relation with the internal tooth member 110, the circular grooves 130a, 130b and 130c being opposed to the circular grooves 120a, 120b and 120c of the first rotational member 120.

Herein, the first rotational member 120 and the second rotational member 130 are centrally formed with the central holes 120d and 130d, respectively.

Also, the eccentric orbiting type speed reducer 100 comprises a first external gear 141 having the external teeth 141a on the outer circumference, with three through holes 141b, 141c and 141d formed inside, the external teeth 141a meshing with the internal teeth 110a of the internal tooth member 110, the first external gear 141 being carried between the first rotational member 120 and the second rotational member 130, and a second external gear 142 having the external teeth 142a on the outer circumference, with three through holes 142b, 142c and 142d formed inside, the external teeth 142a meshing with the internal teeth 110a of the internal tooth member 110, the second external gear 142 being carried between the first rotational member 120 and the second rotational member 130.

Herein, the first external gear 141 has a plurality of play holes 141e formed on the circumference, besides three through holes 141b, 141c and 141d formed inside, and is centrally formed with one central hole 141f, and the second external gear 142 has also the same constitution. Also, the first rotational member 120 has a plurality of projections 120e on the circumference, the plurality of projections 120e for the first rotational member 120 being inserted into the play holes 141e and 142e, respectively, and secured to the second rotational member 130 by means of a plurality of bolts 136.

Also, the eccentric orbiting type speed reducer 100 comprises three crankshafts 151, 152 and 153, a crankshaft 151 having the first insertion portions 151a inserted into a pair of circular grooves 120a and 130a opposed for the first rotational member 120 and the second rotational member 130 at both end portions and the second insertion portions 151b inserted into a through hole 141b of the first external gear 141 and a through hole 142b of the second external gear 142 in the central portion. The crankshafts 152 and 153 have the same constitution as the crankshaft 151.

Herein, the outer diameter of the first insertion portion 151a for the crankshaft 151 is larger than those of the first insertion portions 152a and 153a for the crankshafts 152 and 153, and the outer diameter of the second insertion portion 151b for the crankshaft 151 is larger than those of the second insertion portions 152b and 153b for the crankshafts 152 and 153.

The eccentric orbiting type speed reducer 100 comprises, as a plurality of rolling elements, three pairs of first bearings 161, 162 and 163 having the rolls 161a, 162a and 163a, respectively, a pair of first bearings 161 being inserted into a pair of circular grooves 120a and 130a opposed to each other for the first rotational member 120 and the second rotational member 130, and engaged with the first insertion portion 151a of the crankshaft 151, so that the crankshaft 151 inserted into a pair of circular grooves 120a and 130a is held rotatably with respect to the first rotational member 120 and the second rotational member 130. One pair of first bearings 162 and 163 have also the same constitution as one pair of first bearings 161.

Herein, the basic radial load rating of the first bearing 161 is greater than the basic radial load ratings of the first bearings 162 and 163.

The basic radial load rating is described in "Basic load rating for roll bearing and calculating method of rating life" in JIS B 1518-1992, the life of bearing being longer with greater basic radial load rating. Supposing that bm is a rating coefficient with ordinarily used material and manufacturing quality, fc is a coefficient determined by the shape of each part of bearing, working precision and material, i is the number of rows of rolling element in one bearing, Lwc is an effective length (mm) of roll, α is a nominal angle of contact (°), Z is the number of rolling elements in single row bearing or the number of rolling elements per row in multi-row bearing with each row having the same number of rolling elements, and Dwe is a diameter (mm) of roll used in the calculation, the basic radial load rating Cr of a radial roll bearing is given by the following expression (1).

$$Cr = bmfc(iLwc \cos_\alpha)^{7/9} Z^{3/4} Dwe^{29/27} \quad (1)$$

Figure 3:
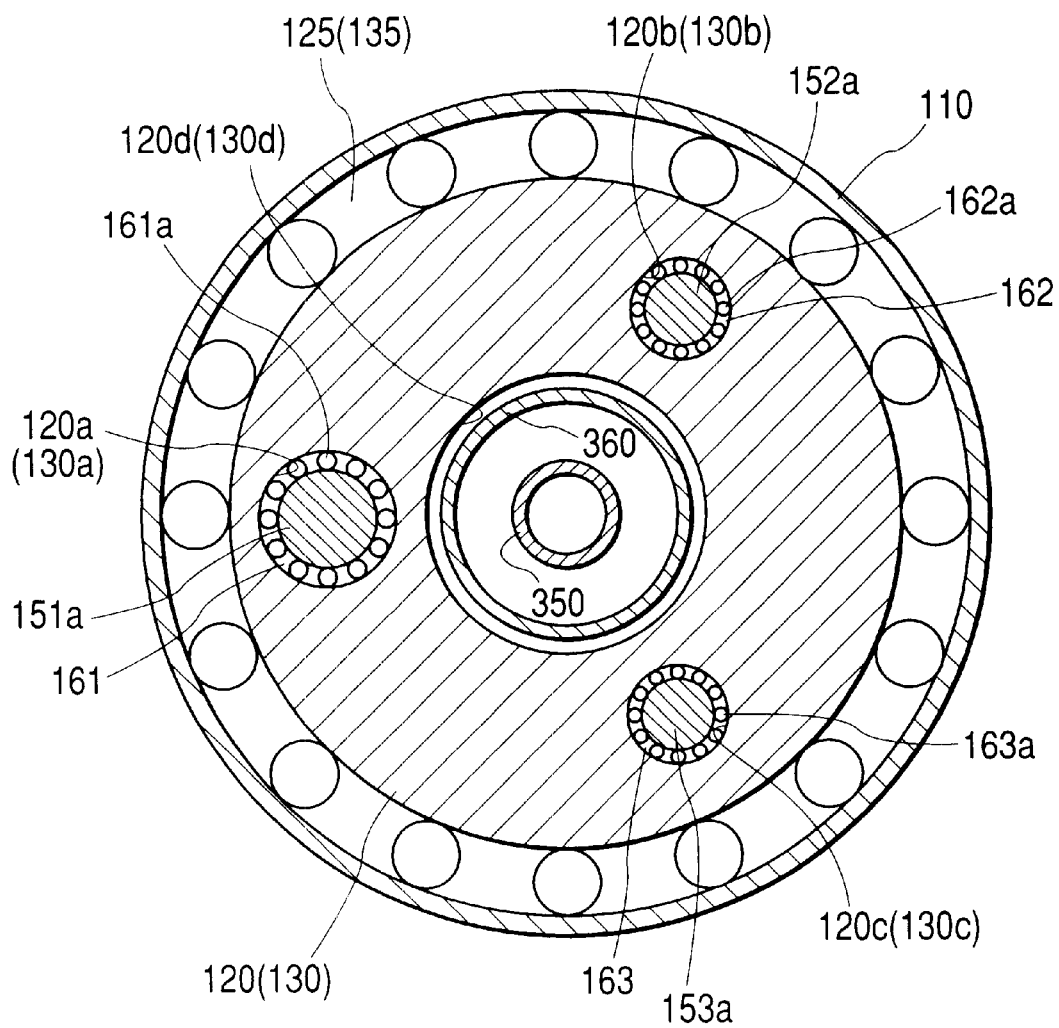
FIG. 3 is a cross-sectional view of FIG. 1 as taken along the arrow A—A or arrow A'—A'.

Specifically, the diameter of a roll 161a is larger than those of the rolls 162a and 163a, so that the basic radial load rating of the first bearing 161 is greater than the basic radial load ratings of the first bearings 162 and 163, as shown in FIG. 3.

Also, the eccentric orbiting type speed reducer 100 comprises, as a plurality of rolling elements, three pairs of second bearings 171, 172 and 173 having rolls 171a, 172a and 173a, respectively, a pair of second bearings 171 having one second bearing inserted into the through hole 141b of the first external gear 141 and the other inserted into the through hole 142b of the second external gear 142, and engaged with the second insertion portion 151b of the crankshaft 151, so that the crankshaft 151 inserted into the through holes 141b and 142b is held rotatably with respect to the first external gear 141 and the second external gear 142. One pair of second bearings 172 and 173 have also the same constitution as one pair of second bearings 171.

Herein, the basic radial load rating of the second bearing 171 is greater than the basic radial load ratings of the second bearings 172 and 173.

Figure 4:
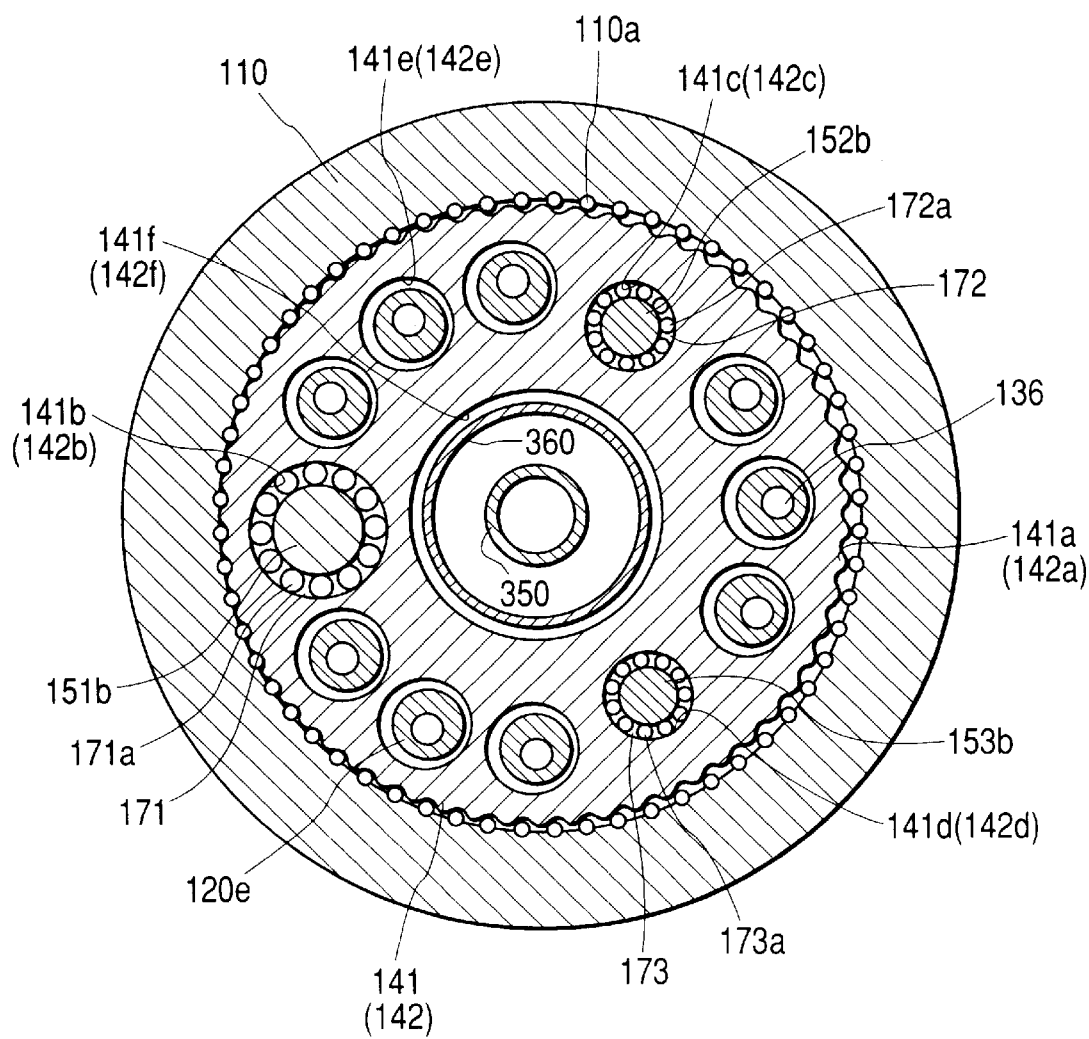
FIG. 4 is a cross-sectional view of FIG. 1 as taken along the arrow B—B or arrow B'—B'.
Figure 5:
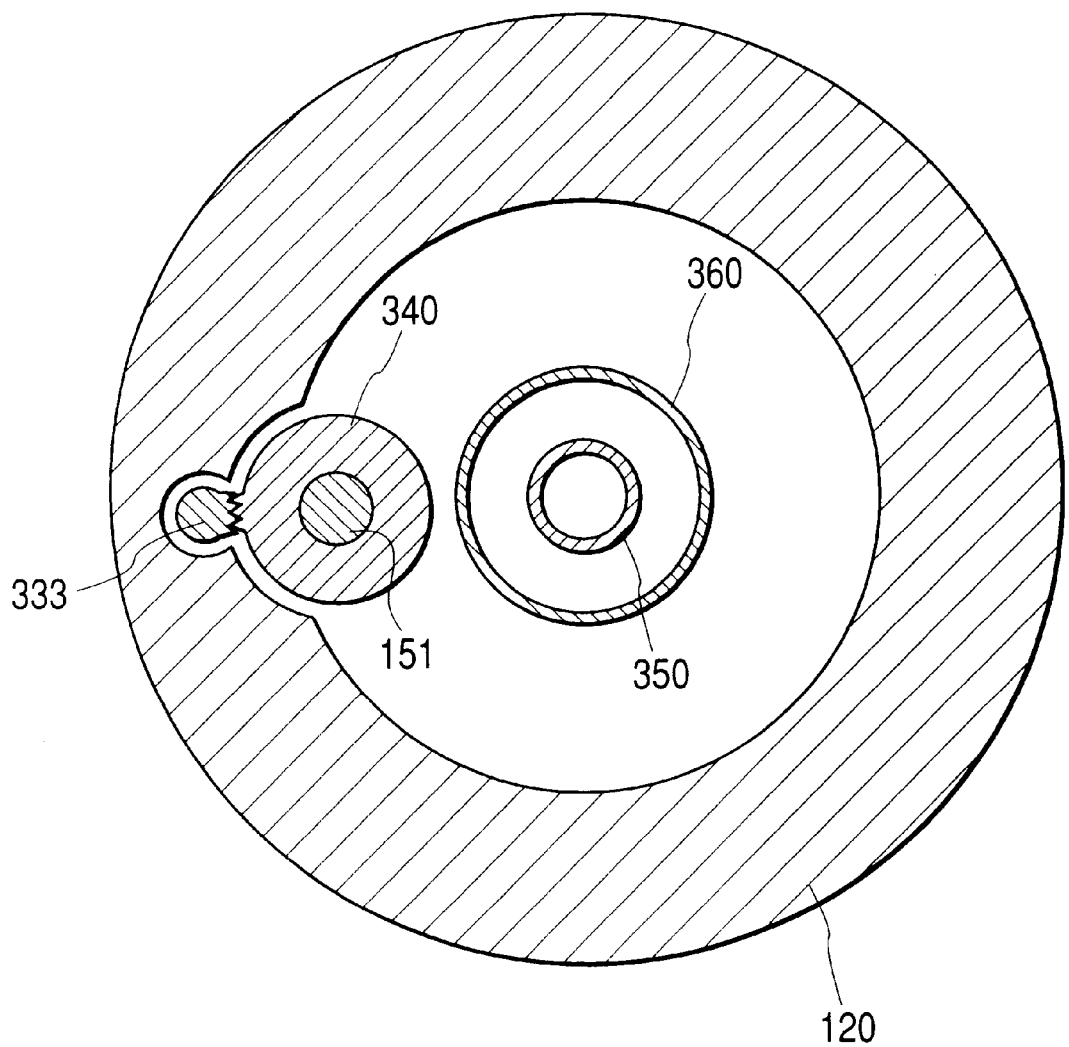
FIG. 5 is a cross-sectional view of FIG. 1 as taken along the arrow C—C.

Specifically, the diameter of a roll 171a is larger than those of the rolls 172a and 173a, and the number of rolls 171a is more than the number of rolls 172a and 173a, so that the basic radial load rating of the second bearing 171 is greater than the basic radial load ratings of the second bearings 172 and 173, as shown in FIG. 4.

The eccentric orbiting type speed reducer 100 with the above constitution eccentrically moves the first external gear 141 and the second external gear 142 with the internal tooth member 110.

Figure 2:
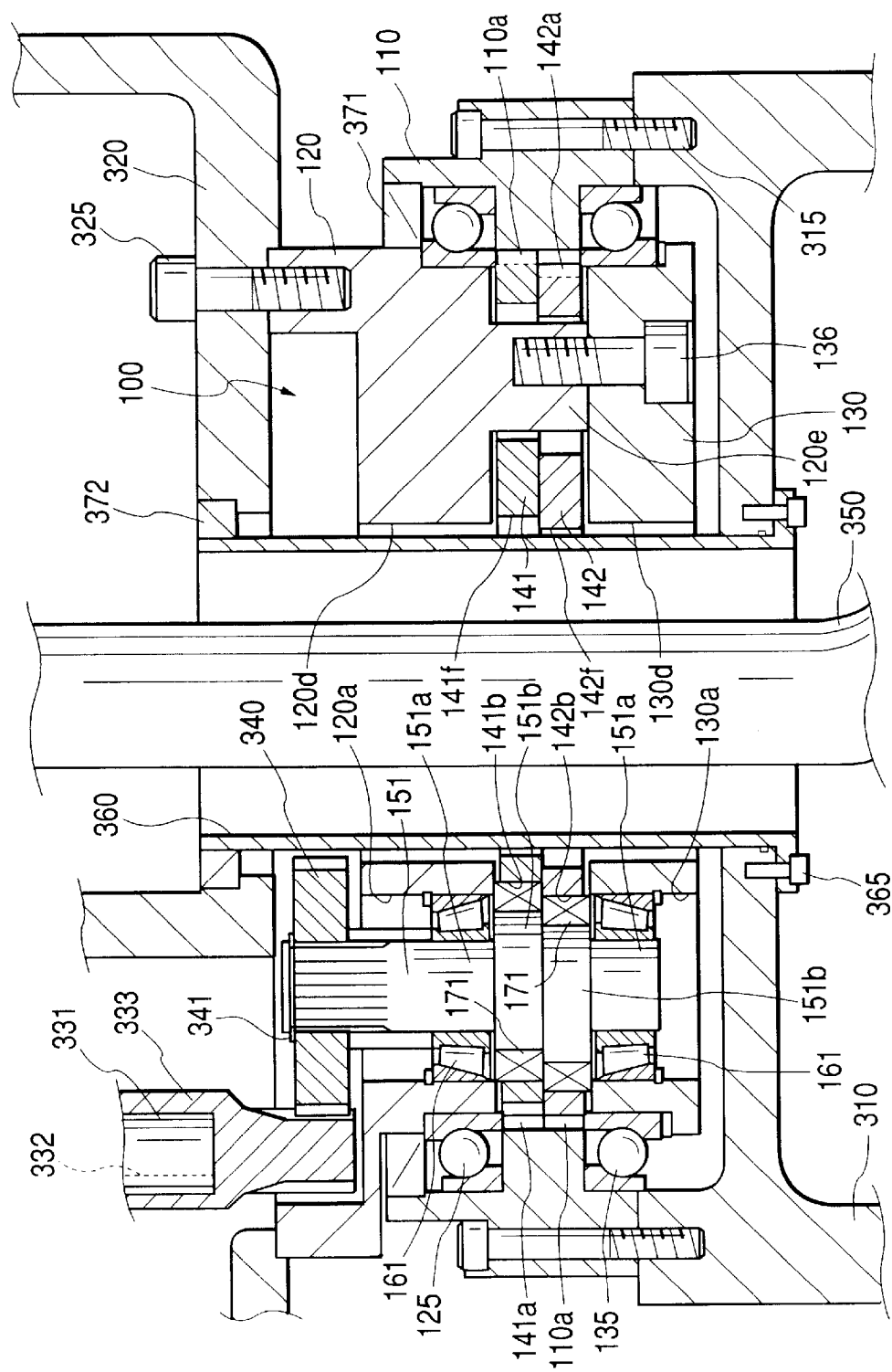
FIG. 2 is a front cross-sectional view of an eccentric orbiting type speed reducer for the joint of the industrial machine as shown in FIG. 1.

As shown in FIGS. 1 and 2, the joint 300 of the industrial machine comprises a first joint member 310 being integrally engaged with the internal tooth member 110 by a plurality of bolts 315, and placed on the floor, and a second joint member 320 being integrally engaged with the first rotational member 120 by a plurality of bolts 325, whereby the first joint member 310 and the second joint member 320 are rotated relatively via the eccentric orbiting type speed reducer 100.

Also, the joint 300 of the industrial machine has an output shaft 331 for outputting a rotational driving force, a first gear 333 integrally engaged with the output shaft 331 via a key 332, a motor 330 secured to the second joint member 320 and a second gear 340 integrally engaged at the top end of the crankshaft 151 by a stopper 341 to be mated with the first gear 333, a rotational driving force that the motor 330 outputs from the output shaft 331 being input into one crankshaft 151 alone among three crankshafts 151, 152 and 153 via the first gear 333 and the second gear 340.

Also, the joint 300 of the industrial machine comprises a cable 350 passing through a central hole 120d of the first rotational member 120, a central hole 141f of the first external gear 141, a central hole 142f of the second external gear 142, and a central hole 130d of the second rotational member 130, and a protective barrel 360 for protecting the cable 350 not to come into contact with the eccentric orbiting type speed reducer 100, the protective barrel being inserted into the central hole 120d of the first rotational member 120, the central hole 141f of the first external gear 141, the central hole 142f of the second external gear 142, and central hole 130d of the second rotational member 130, and secured to the first joint member 310 by a plurality of bolts 365.

The joint 300 of the industrial machine comprises an oil seal 371 between the internal tooth member 110 and the first rotational member 120, and an oil seal 372 between the second joint member 320 and the protective barrel 360, thereby preventing the lubricating oil within the eccentric orbiting type speed reducer 100 from flowing outside the eccentric orbiting type speed reducer 100.

Referring now to FIGS. 1 to 9, the action of the joint 300 of the industrial machine according to this embodiment of the invention will be described below.

The action of the joint 300 of the industrial machine in the case where the motor outputs a rotational driving force is the same as that of the joint 300 of the conventional industrial machine, except that the rotational driving force output from the motor 330 is input into one crankshaft 151 alone among three crankshafts 151, 152 and 153, and is not described here.

If the motor 330 outputs a rotational driving force, the rotational driving force output from the motor 330 is transmitted via the output shaft 331, the first gear 333 and the second gear 340 to the crankshaft 151.

Herein, since the internal tooth member 110 is secured to the first joint member 310 placed on the floor by the bolts 315, the rotational driving force transmitted to the crankshaft 151 is reduced in speed at high ratio by the internal teeth 110a of the internal tooth member 110, the external teeth 141a of the first external gear 141 and the external teeth 142a of the second external gear 142, and transmitted to the first rotational member 120 and the second rotational member 130 integrally engaged by the plurality of bolts 136.

Since the second joint member 320 is integrally engaged with the first rotational member by the plurality of bolts 325, the rotational driving force transmitted to the first rotational member 120 and the second rotational member 130 integrally engaged by the plurality of bolts 136 can be transmitted to the second joint member 320.

Accordingly, if the motor 330 outputs a rotational driving force, the second joint member 320 is rotated with respect to the first joint member 310 placed on the floor.

The action of the characteristic parts for the joint 300 of the industrial machine according to this embodiment of the invention will be described below.

As described above, in the joint 300 of the industrial machine according to this embodiment of the invention, a rotational driving force output from the motor 330 is input into one crankshaft 151 alone among three crankshafts 151, 152 and 153.

Accordingly, in the joint 300 of the industrial machine according to this embodiment of the invention, there is no need of having the gears or bearings, which were provided to input the rotational driving force to all three crankshafts 151, 152 and 153 in the joint of the conventional industrial machine. Therefore, the joint 300 of the industrial machine can be produced at lower costs with less increase in the number of parts.

Since the basic radial load rating of the first bearing 161 is greater than the basic radial load rating of the first bearings 162 and 163, the joint 300 of the industrial machine is unlikely to break down at the first bearing 161.

Also, since the basic radial load rating of the second bearing 171 is greater than the basic radial load rating of the second bearings 172 and 173, the joint 300 of the industrial machine is unlikely to break down at the second bearing 171.

The invention can take, besides the above constitution of this embodiment, another constitution as shown in FIGS. 6 to 9 for the first insertion portion 151a of the crankshaft 151, the second insertion portion 151b of the crankshaft 151, the first bearing 161 and the second bearing 171, whereby the joint 300 of the industrial machine is unlikely to break down at the first insertion portion 151a of the crankshaft 151, the second insertion portion 151b of the crankshaft 151, the first bearing 161 and the second bearing 171.

In FIGS. 6 to 9, a member 400 shows the first insertion portion 151a of the crankshaft 151, or the second insertion portion 151b of the crankshaft 151, a bearing 410 shows the first bearing 161 or the second bearing 171, and a roll 410a of a bearing 410 shows the roll 161a of the first bearing or the roll 171a of the second bearing 171. Also, a member 500 shows the first insertion portions 152a and 153a of the crankshafts 152 and 153, or the second insertion portions 151b and 153b of the crankshafts 152 and 153, a bearing 510 shows the first bearings 162 and 163, or the second bearings 172 and 173, and a roll 510a of a bearing 510 shows the rolls 162a and 163a of the first bearings 162 and 163 or the rolls 172a and 173a of the second bearings 172 and 173.

In FIG. 6, the outer diameters of the member 400 and the bearing 410 are larger than those of the member 500 and the bearing 510, respectively, and the diameter of the rolls 410a is equal to that of the rolls 510a, but the number of rolls 410a is more than that of rolls 510a.

Figure 7B:
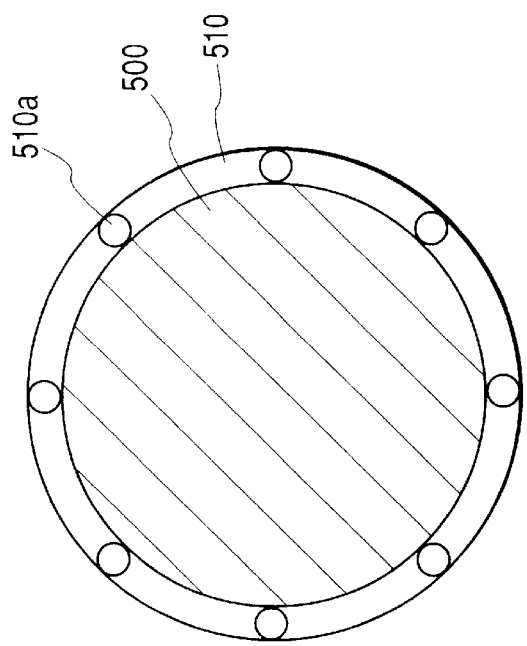
FIG. 7 is a schematic view for explaining other embodiment of the invention than the embodiment as shown in FIG. 6.
Figure 7A:
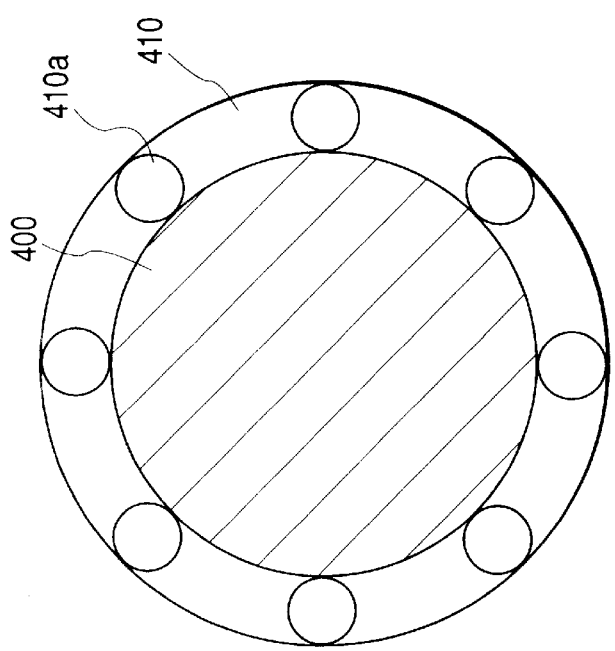

In FIG. 7, the outer diameter of the member 400 is equal to that of the member 500, and the outer diameter of the bearing 410 is larger than that of the bearing 510. Also, the number of rolls 410a is equal to that of rolls 510a, but the diameter of rolls 410a is larger than that of rolls 510a.

Figure 8B:
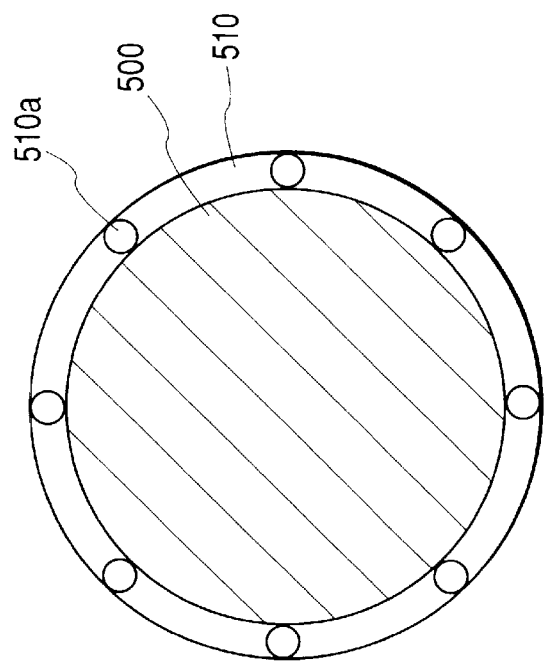
FIG. 8 is a schematic view for explaining other embodiment of the invention than the embodiments as shown in FIGS. 6 and 7.
Figure 8A:
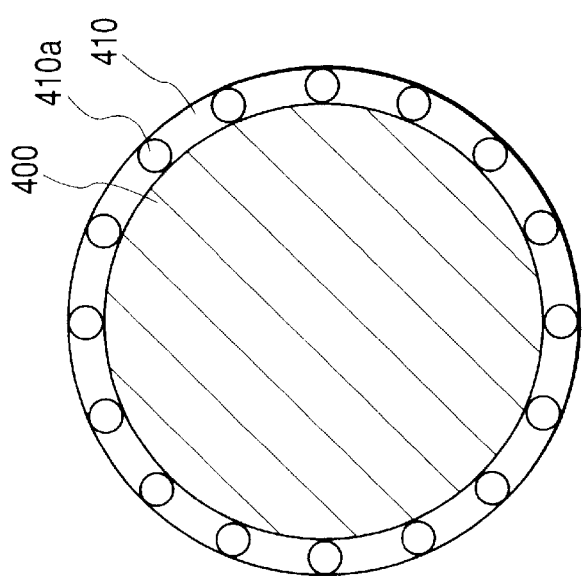

In FIG. 8, the outer diameters of the member 400 and the bearing 410 are larger than those of the member 500 and the bearing 510, respectively, and the diameter of the rolls 410a is equal to that of the rolls 510a, but the number of rolls 410a is more than that of rolls 510a.

Figure 9B:
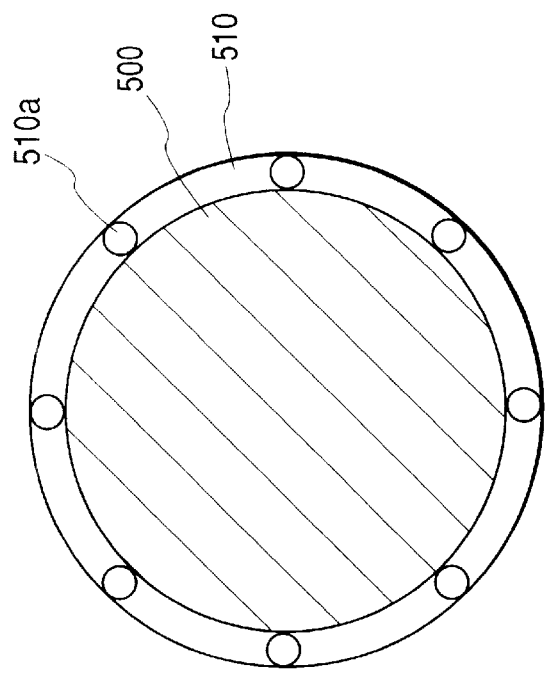
FIG. 9 is a schematic view for explaining other embodiment of the invention than the embodiments as shown in FIGS. 6 to 8.
Figure 9A:
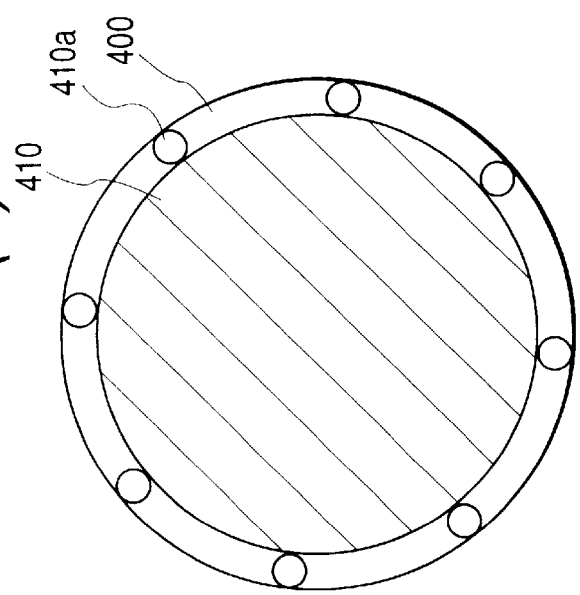
Figure 10:
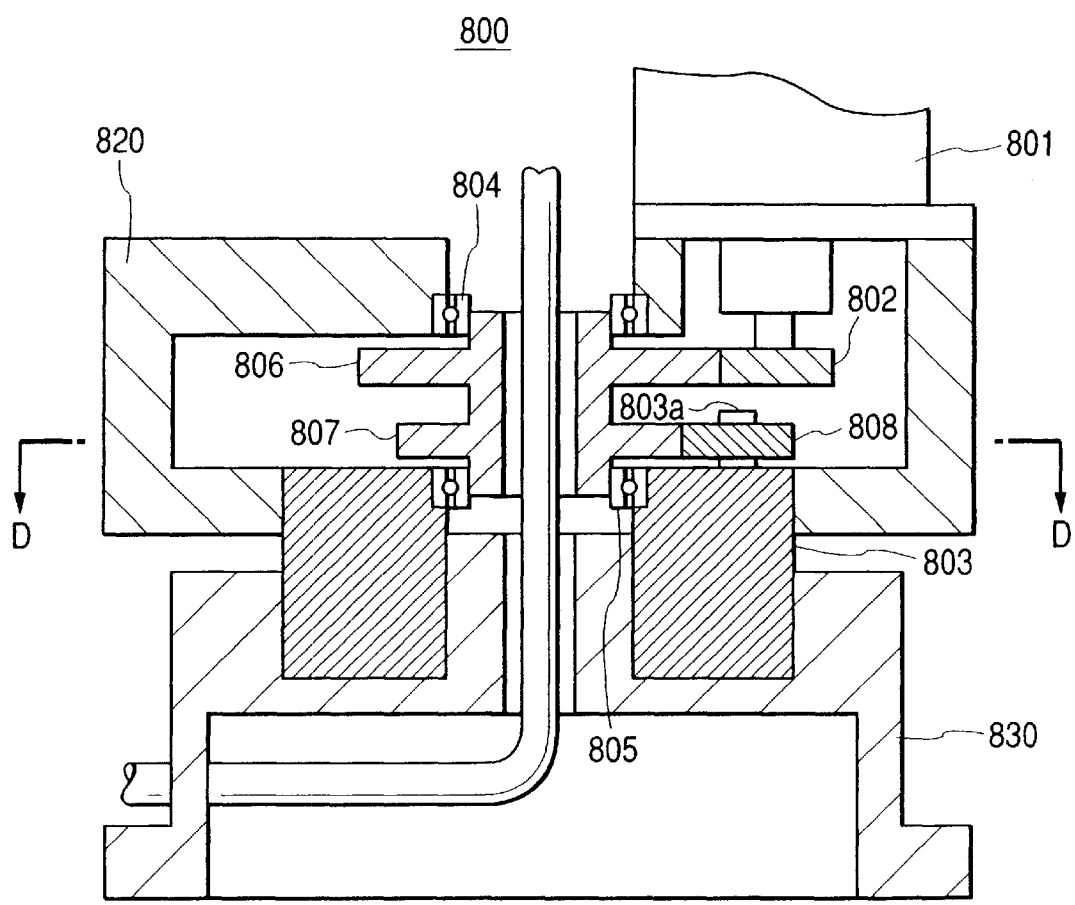
FIG. 10 is a front cross-sectional view of a joint of the conventional industrial machine.
Figure 11:
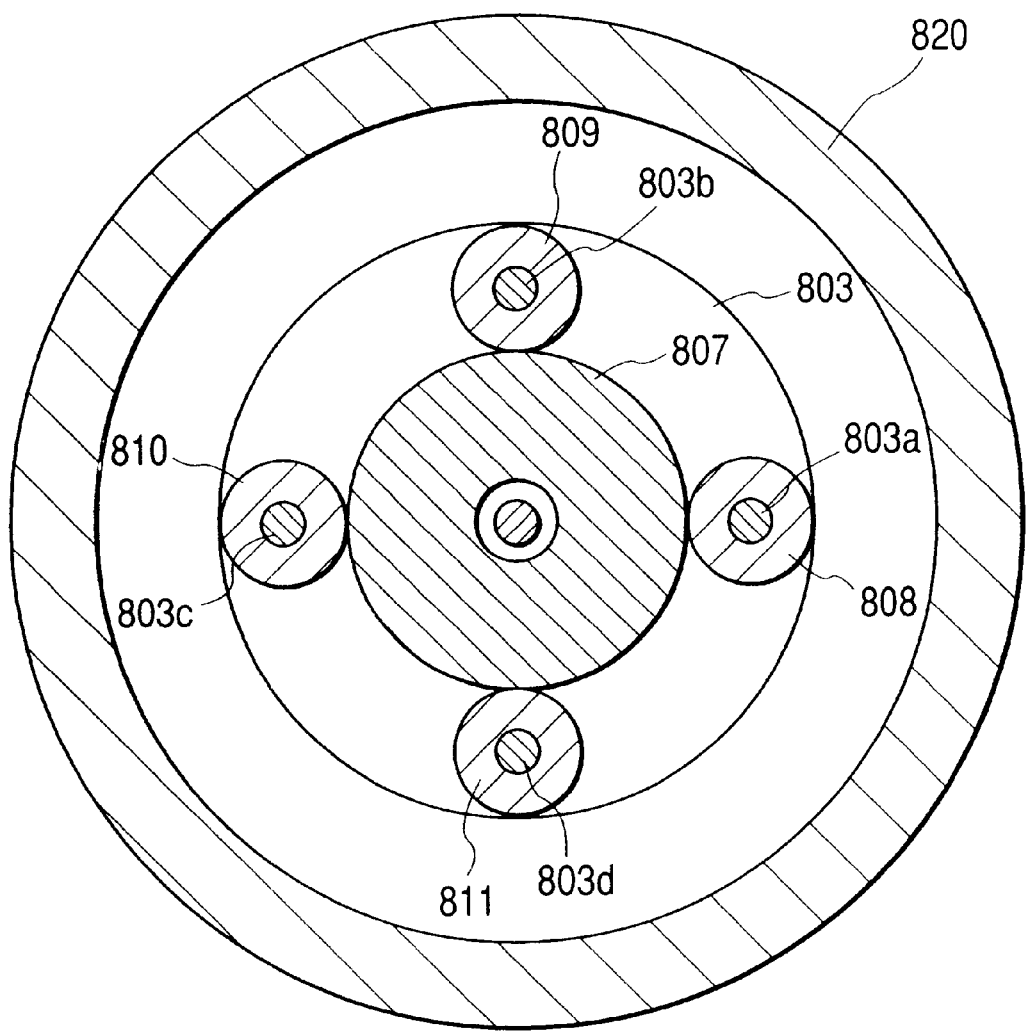
FIG. 11 is a cross-sectional view of FIG. 10 as taken along the arrow D—D.
Figure 12:
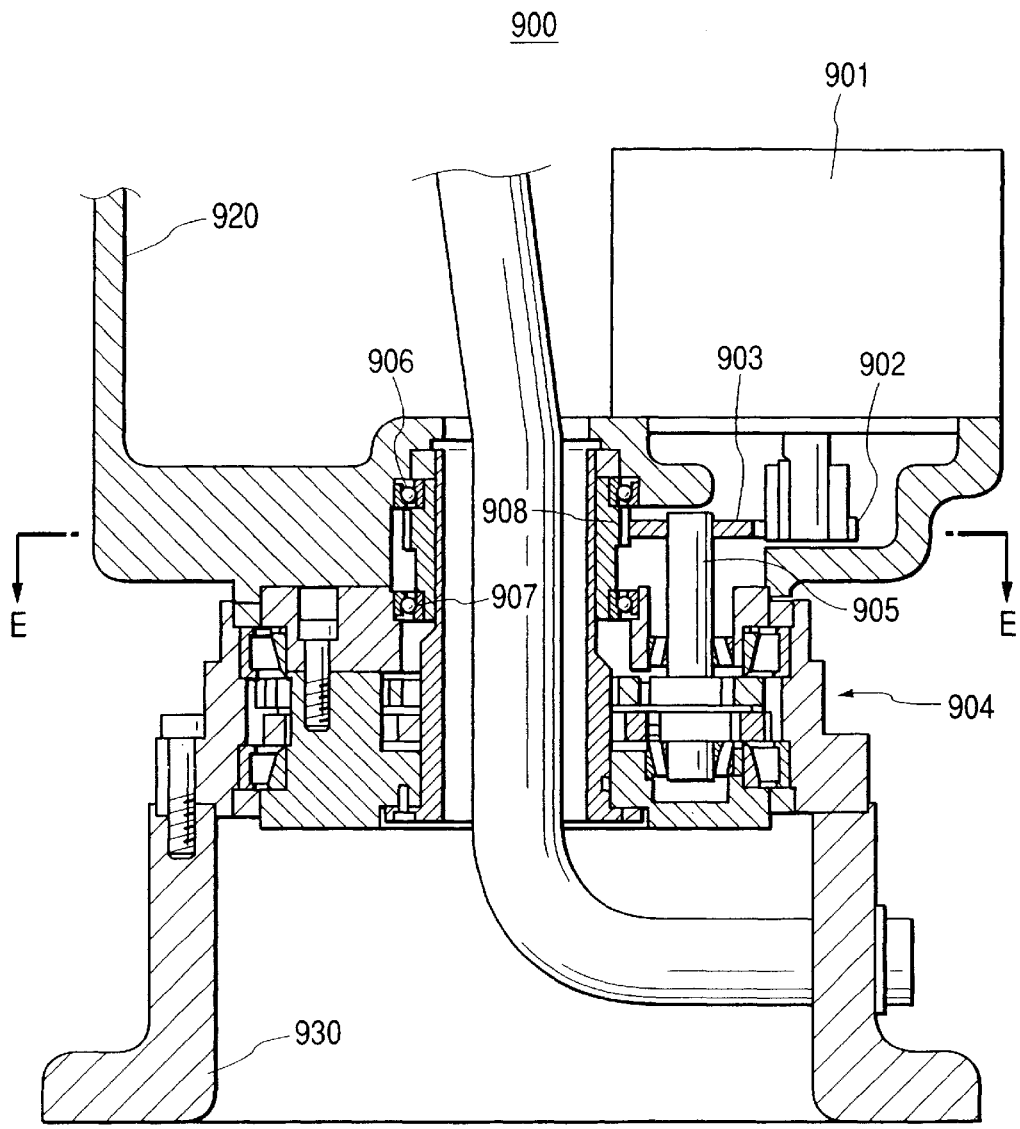
FIG. 12 is a front cross-sectional view of the joint of the conventional industrial machine other than the embodiments as shown in FIG. 11.
Figure 13:
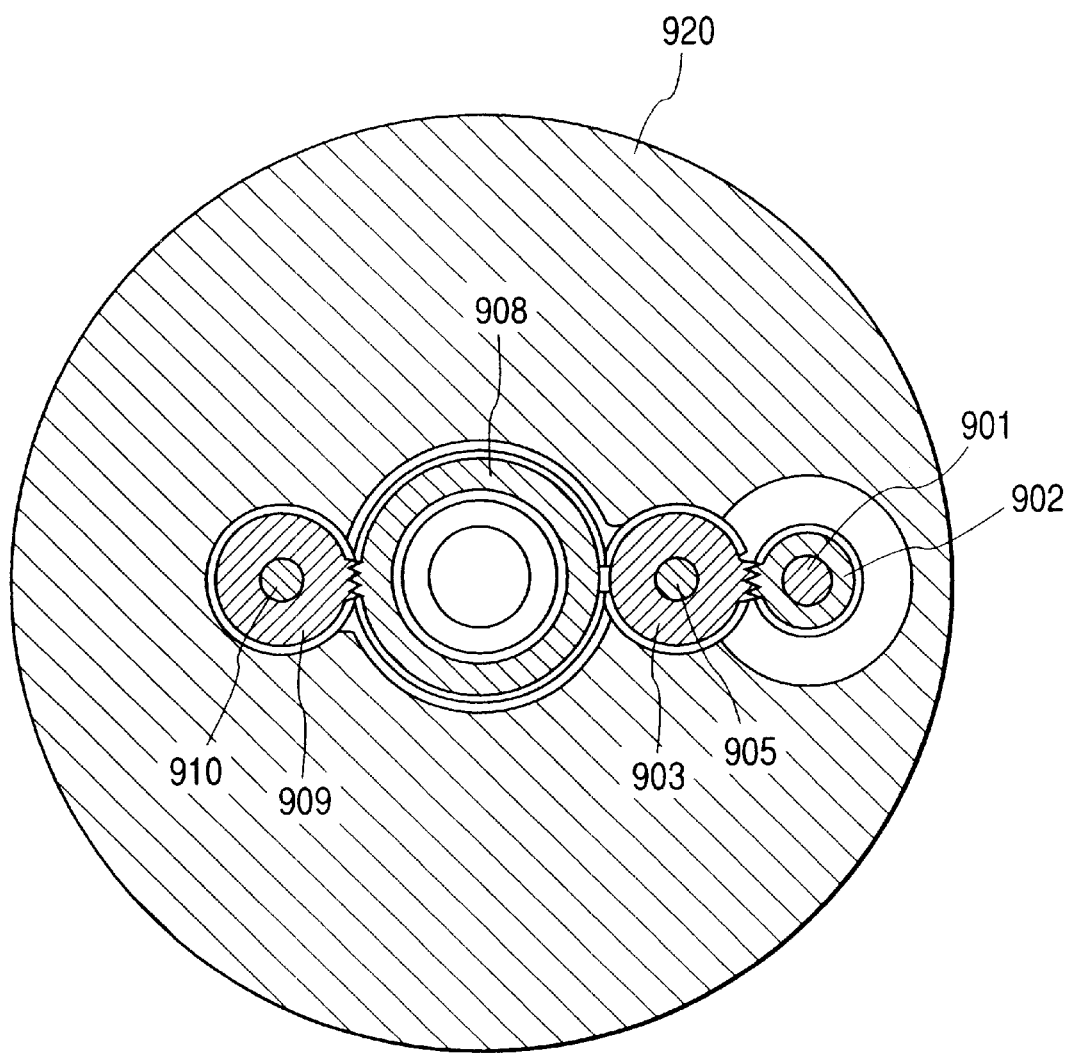
FIG. 13 is a cross-sectional view of FIG. 12 as taken along the arrow E—E.

In FIG. 9, the outer diameters of the member 400 and the bearing 410 are equal to those of the member 500 and the bearing 510, respectively. The diameter and number of rolls 410a are equal to those of rolls 510a. However, the hole into which the bearing 410 is inserted, the roll 410 and the member 400 are specifically treated for hardening or formed of hard material. Herein, the hole into which the bearing 410 is inserted is the circular groove 120a or 130a, for example, in the case that the bearing 410 is considered to be the first bearing 161.

In this embodiment, the eccentric orbiting type speed reducer 100 having three crankshafts has been described below. However, according to this invention, any number of crankshafts may be employed.

Also, in this embodiment, the eccentric orbiting type speed reducer 100 has been described above in which the first rotational member 120, the first external gear 141, the second external gear 142, and the second rotational member 130 are formed with the central hole 120d, the central hole 141f, the central hole 142f and the central hole 130d, respectively. However, this invention is applicable to the eccentric orbiting type speed reducers of a variety of shapes, in which the motor 330 may be disposed in various ways. For example, the output shaft 331 of the motor 330 may be connected via a coupling directly to the crankshaft 151.

As described above, with this invention, it is possible to provide an eccentric orbiting type speed reducer and a joint of the industrial machine equipped with the eccentric orbiting type speed reducer that can be manufactured at lower costs with less increase in the number of parts.

What is claimed is:

1. An eccentric orbiting speed reducer comprising:

an internal tooth member having internal teeth formed on an inner circumference;

a first rotational member with a plurality of circular grooves formed inside that is carried rotatably by said internal tooth member, while keeping a coaxial relation with said internal tooth member;

a second rotational member with a plurality of circular grooves formed inside, said plurality of circular grooves being opposed respectively to said plurality of circular grooves for said first rotational member, said second rotational member being carried rotatably by said internal tooth member, while keeping a coaxial relation with said internal tooth member;

an external gear having external teeth formed on an outer circumference, with a plurality of through holes formed inside, said external teeth meshing with said internal teeth of said internal tooth member, said external gear being carried between said first rotational member and said second rotational member;

a plurality of crankshafts having first insertion portions to be inserted respectively into said plurality of pairs of opposed circular grooves for said first rotational member and said second rotational member, and second insertion portions to be inserted respectively into said plurality of through holes for said external gear and orbiting eccentrically said external gear, said crankshafts being arranged circumferentially with respect to an axis of said internal tooth member;

a plurality of pairs of first bearings for holding said first insertion portions of said crankshafts rotatably with respect to said first rotational member and said second rotational member, respectively; and a plurality of second bearings for holding said second insertion portions of said crankshafts rotatably with respect to said external gear;

wherein a basic radial load rating of said first bearing into which said first insertion portion of one of said plurality of crankshafts is inserted is greater than basic radial load ratings of said first bearings into which said first insertion portions of the remaining crankshafts among said plurality of crankshafts are inserted.

2. An eccentric orbiting speed reducer comprising:

an internal tooth member having internal teeth formed on an inner circumference;

a first rotational member with a plurality of circular grooves formed inside that is carried rotatably by said internal tooth member, while keeping a coaxial relation with said internal tooth member;

a second rotational member with a plurality of circular grooves formed inside, said plurality of circular grooves being opposed respectively to said plurality of circular grooves for said first rotational member, said second rotational member being carried rotatably by said internal tooth member, while keeping a coaxial relation with said internal tooth member;

an external gear having external teeth formed on an outer circumference, with a plurality of through holes formed inside, said external teeth meshing with said internal teeth of said internal tooth member, said external gear being carried between said first rotational member and said second rotational member;

a plurality of crankshafts having first insertion portions to be inserted respectively into said plurality of pair of opposed circular grooves for said first rotational member and said second rotational member, and second insertion portions to be inserted respectively into said plurality of through holes for said external gear and orbiting eccentrically said external gear, said crankshafts being arranged circumferentially with respect to an axis of said internal tooth a plurality of pairs of first bearings for holding said first insertion portions of said crankshafts rotatably with respect to said first rotational member and said second rotational member; and a plurality of second bearings for holding said second insertion portions of said crankshafts rotatably with respect to said external gear;

wherein a basic radial load rating of said second bearing into which said second insertion portion of one of said plurality of crankshafts is inserted is greater than basic radial load ratings of rolling elements of said second bearings onto which said second insertion portions of the remaining crankshafts among said plurality of crankshafts are inserted.

3. A joint for an industrial machine comprising an eccentric orbiting speed reducer for eccentrically orbiting an external tooth member with respect to an internal tooth member, and a motor having an output shaft for outputting a rotational driving force;

wherein said eccentric orbiting speed reducer comprises:

said internal tooth member having internal teeth formed on an inner circumference;

a first rotational member with a plurality of circular grooves formed inside that is carried rotatably by said internal tooth member, while keeping a coaxial relation with said internal tooth member;

said second rotational member with a plurality of circular grooves formed inside, said plurality of circular grooves being opposed to said plurality of circular grooves for said first rotational member, said second rotational member being carried rotatably by said internal tooth member, while keeping a coaxial relation with said internal tooth member;

an external gear having external teeth formed on an outer circumference, with a plurality of through holes formed inside, said external teeth meshing with said internal teeth of said internal tooth member, said external gear being carried between said first rotational member and said second rotational member;

a plurality of crankshafts having first insertion portions to be inserted respectively into said plurality of pair of opposed circular grooves for said first rotational member and said second rotational member, and second insertion portions to be inserted respectively into said plurality of through holes for said external gear, said crankshafts being arranged circumferentially with respect to an axis of said internal tooth member;

a plurality of pairs of first bearings for holding said first insertion portions of said crankshafts rotatably with respect to said first rotational member and said second rotational member, said first bearings being inserted into said plurality of pairs of opposed circular grooves for said first rotational member and said second rotational member; and a plurality of second bearings for holding said second insertion portions of said crankshafts rotatably with respect to said external gear, said second bearings being inserted into said plurality of through holes for said external gear;

wherein a rotational driving force output from said output shaft is input into said crankshaft in which a basic radial load rating of said first bearing or said second bearing or said first and second bearings is greater than those of said other crankshafts.

4. In an eccentric orbiting speed reducer for a joint of an industrial machine having a plurality of crankshafts arranged circumferentially with respect to an axis of an internal tooth member, a rotational driving force is input into one crankshaft alone among the plurality of crankshafts, and bearing capacity for one crankshaft among the plurality of crankshafts is greater than bearing capacities for other crankshafts.

* * * * *

UNITED STATES PATENT AND TRADEMARK OFFICE
CERTIFICATE OF CORRECTION

PATENT NO. : 6,517,460 B2
DATED : February 11, 2003
INVENTOR(S) : Kenichi Takeuchi and Jun Hirose It is certified that error appears in the above-identified patent and that said Letters Patent is hereby corrected as shown below:

Column 11,
Line 18, after "tooth", insert -- member; -- and start a new paragraph before "a plurality of pairs".

Signed and Sealed this

Fourth Day of April, 2006

JON W. DUDAS
*Director of the United States Patent and Trademark Office*